(12) United States Patent  (10) Patent No.: US 7,302,792 B2
Land, III et al.  (45) Date of Patent: Dec. 4, 2007

(54) PULSED PLASMA THRUSTER AND METHOD OF MAKING

(75) Inventors: H. Bruce Land, III, Laurel, MD (US); Daniel H. Simon, Eldersburg, MD (US); Tharen Rice, Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 407 days.

(21) Appl. No.: 10/965,166

(22) Filed: Oct. 14, 2004

(65) Prior Publication Data

US 2005/0217238 A1 Oct. 6, 2005

Related U.S. Application Data

(60) Provisional application No. 60/511,771, filed on Oct. 16, 2003.

(51) Int. Cl.
*F03H 1/00* (2006.01)
*H01J 7/24* (2006.01)

(52) U.S. Cl. .................................................. 60/203.1
(58) Field of Classification Search .................. 60/202, 60/203.1
See application file for complete search history.

(56) References Cited

U.S. PATENT DOCUMENTS 3,298,179 A * 1/1967 Maes ......................... 60/202
3,636,709 A    1/1972 La Rocca
3,789,608 A    2/1974 Free
4,821,509 A    4/1989 Burton et al.
5,117,627 A    6/1992 Runavot
5,175,996 A    1/1993 Smith
5,425,231 A    6/1995 Burton
5,439,191 A    8/1995 Nichols et al.
5,568,723 A    10/1996 Burke et al.
5,924,278 A    7/1999 Burton et al.
6,001,426 A    12/1999 Witherspoon et al.
6,153,976 A    11/2000 Spanjers
6,173,565 B1   1/2001 Cassady et al.
6,216,445 B1   4/2001 Byers et al.
6,260,445 B1   7/2001 DeVecchis et al.
6,269,629 B1   8/2001 Spanjers
6,295,804 B1   10/2001 Burton et al.
6,300,720 B1   10/2001 Birx
6,373,023 B1   4/2002 Hoskins et al.
6,516,604 B2   2/2003 Mojarradi et al.
6,771,519 B2 * 8/2004 Frus et al. ............... 363/21.12
6,818,853 B1 * 11/2004 Schein et al. .......... 219/121.52
2002/0023427 A1  2/2002 Majarradi et al.
2003/0033797 A1  2/2003 Spanjers et al.

* cited by examiner

*Primary Examiner*—Ted Kim
(74) *Attorney, Agent, or Firm*—Francis A. Cooch

(57) ABSTRACT

A pulsed plasma thruster (PPT) and a method of making the pulsed plasma thruster are disclosed. The PPT includes no moving parts and is able to achieve a small size. The PPT is also designed to facilitate easy and rapid manufacture. The process for making the PPT uses known techniques for making printed circuit board devices. Another PPT also has no moving parts and uses a liquid fuel that is progressively advanced by capillary action.

13 Claims, 12 Drawing Sheets

PULSED PLASMA THRUSTER AND METHOD OF MAKING

CROSS REFERENCE TO RELATED APPLICATIONS

This application claims the benefit of U.S. Provisional Patent Application No. 60/511,771, filed on Oct. 16,2003. This Provisional Patent Application is hereby incorporated by reference in its entirety.

BACKGROUND OF THE INVENTION

1. Field of the Invention

This invention relates to a Pulsed Plasma Thruster ("PPT") and a method for making a PPT.

2. Related Art

As satellites become smaller and as larger satellites require highly precise motion control, a need arises for smaller thrusters. PPTs have been proposed for use in these kinds of applications and many different PPT designs have been attempted.

Spanjers (U.S. Pat. No. 6,269,629) discloses a micro-PPT that uses a coaxial cable configuration. Spanjers uses the insulation of the cable or the spacer, made of a copolymer, disposed between a cylindrical outer conductor and an inner conductor as the fuel.

Spanjers (U.S. Pat. No. 6,153,976) discloses a PPT that replaces a spark igniter with a mechanical switch that contacts the face of an electrically conductive propellant. This reference also provides a background description of PPT's in general.

Burton et al. (U.S. Pat. No. 4,821,509) discloses a pulsed electrothermal thruster. This invention attempts to provide conditions that lead to electrothermally-dominated flow. Specifically, a high pressure discharge with very low ionization is disclosed. The electrical discharge includes the use of a capillary tube, but the size of the capillary is governed by the need to produce high discharge pressures.

Burton (U.S. Pat. No. 5,425,231) discloses a gas fed pulsed electric thruster. This invention is gas fed and operates at an enormously high repetition rate. This is done in order to maximize the utilization of the gas propellant. In this design, the gas propellant is constantly flowing through the device rather than shutting the gas on and off between discharges.

LaRocca (U.S. Pat. No. 3,575,003) teaches a thruster that operates by accerating gasses. LaRocca discloses a device that includes an array of radially oriented electrodes. LaRocca also discloses the use of a specially formulated melted propellant that moves by the action of surface tension. This design does not provide the capability to operate a thruster using common liquid or melted solid substances as propellants.

While the related art generally teaches different PPT designs, none of the references teach a compact or micro-PPT that is susceptible to easy and rapid manufacture, includes no moving parts and is easy to deploy and integrate into existing and future satellite architecture. Current designs employ springs or other mechanical devices that are used to convey or advance a solid fuel bar. These springs or other mechanical devices can be very difficult or impractical to use on very small scales.

SUMMARY OF THE INVENTION

In one aspect, the invention provides a PPT comprising: a housing formed by at least one substrate and including a thruster aperture; the thruster aperture including a first conductive layer, a first fuel layer, an igniter device, a second fuel layer and a second conductive layer; a main discharge capacitor and a power supply in electrical communication with the first conductive layer and the second conductive layer; a trigger in electrical communication with the igniter device; and where the substrate is formed of a Printed Circuit Board.

In another aspect, the substrate is made of an insulator such as fiberglass.

In another aspect, the first conductive layer is a conductor such as copper.

In another aspect, the igniter device is a conductor, which may be less massive in relation to the first conductor.

In another aspect, the first fuel layer may be a solid insulator such as Teflon.

In another aspect, the igniter device has an axial length substantially similar to the first fuel layer.

In another aspect, the igniter device has an axial length substantially similar to the second fuel layer.

In another aspect, the invention provides a PPT comprising: a housing formed by at least one substrate and including a thruster aperture; the thruster aperture including a first conductive layer, a first fuel layer, an igniter device, a second fuel layer and a second conductive layer; a main discharge capacitor and a power supply in electrical communication with the first conductive layer and the second conductive layer; a trigger in electrical communication with the igniter device; and where a potential difference across the first conductive layer and the second conductive layer ablates a portion of the first fuel layer and the second fuel layer and also sublimates a portion of the igniter device.

In another aspect, the first fuel layer, the second fuel layer and the igniter device are consumed at substantially similar rates.

In another aspect, an ablating event consumes a substantially similar axial length portion of the first fuel layer, the second fuel layer and the igniter device.

In another aspect, the igniter device is less massive than the first conductive layer.

In another aspect, the igniter device is less massive than the second conductive layer.

In another aspect, a spark capacitor is in electrical communication with the trigger and the igniter device.

In another aspect, the invention provides an array of PPT's comprising: a first PPT formed on a common substrate; a second PPT formed on the common substrate; where the first PPT is laterally spaced from the second PPT.

In another aspect, the first PPT is angled with respect to the second PPT.

In another aspect, another device is mounted on the common substrate.

In another aspect, the device is an integrated circuit.

In another aspect, the device is a surface mounted device.

In another aspect, the array further includes a third PPT.

In another aspect, the first PPT and the second PPT are associated with a second common substrate.

In another aspect, the common substrate and the second common substrate are both printed circuit boards.

In another aspect, the common substrate is a printed circuit board.

In another aspect, the invention provides an array of PPT's comprising: a first substrate having a lower surface, the lower surface including a first groove; a second substrate having an upper surface with a second groove; and wherein a thruster aperture is formed by the first groove and the second groove when the lower surface of the first substrate is joined with the upper surface of the second substrate.

In another aspect, the first and second substrates are a printed circuit boards.

In another aspect, the first and second substrates include integrated nozzles.

In another aspect, a lower surface of the second substrate includes a third groove configured to form a portion of a second thruster aperture.

In another aspect, the invention provides a method of making a PPT comprising the steps of: forming a first groove and a first hole in a first substrate; forming a second groove and a second hole in a second substrate; associating a first conductive layer with the first substrate; associating a second conductive layer with the second substrate; associating a first fuel layer with the first substrate; associating a second fuel layer with the second substrate; associating an igniter device with the first fuel layer; and assembling the first substrate and the second substrate together by confronting the first groove with the second groove and joining the first substrate with the second substrate.

In another aspect, the first conductive layer is printed onto the first substrate.

In another aspect, the first conductive layer is sprayed onto the first substrate.

In another aspect, the first conductive layer is deposited onto the first substrate.

In another aspect, the first conductive layer is a ribbon and is attached to the first substrate.

In another aspect, the first fuel layer is sprayed onto the first conductive layer.

In another aspect, the first fuel layer is deposited onto the first conductive layer.

In another aspect, the first fuel layer is a ribbon and is attached to the first conductive layer.

In another aspect, a second assembly consisting of a second substrate, a second conductive layer, and a second fuel layer is constructed in a fashion similar to that described in [0037] through [0043].

In another aspect, the igniter device is a ribbon and is attached to the first fuel layer.

In another aspect, the igniter device is sprayed onto the first fuel layer.

In another aspect, the igniter device is deposited onto the first fuel layer.

In another aspect, the invention provides a PPT comprising: a first electrode and a second electrode, the first electrode and the second electrode being connected to a capacitor and a power supply; at least one fluid passage disposed between the first electrode and the second electrode; the fluid passage configured to receive a fluid and having an outlet; the outlet is sized so that the fluid forms a meniscus; and where a potential difference between the first electrode and the second electrode vaporizes a portion of the fluid.

In another aspect, a fluid pressure force of the liquid is less than a surface tension force of the liquid.

In another aspect, the liquid fuel is an insulator.

In another aspect, the liquid fuel is a conductor.

In another aspect, insulation is disposed about the fluid passage.

In another aspect, the outlet is disposed proximate to the first electrode.

In another aspect, the outlet is disposed proximate to the second electrode.

In another aspect, the fluid passage is sized so that the fluid is advanced in the fluid passage by capillary action.

In another aspect, the fluid passage is made of a material that provides a non-wetting surface for the fluid.

In another aspect, the fluid is water.

In another aspect, the fluid is hydrazine.

In another aspect, the fluid is ammonia.

In another aspect, the invention provides a PPT comprising: a first electrode and a second electrode, the first electrode and the second electrode both being connected to a capacitor and a power supply; at least one fluid passage disposed between the first electrode and the second electrode; the fluid passage configured to receive a fluid and having an outlet; the fluid passage sized so that the fluid in the fluid passage flows by capillary action; and where a potential difference between the first electrode and the second electrode vaporizes a portion of the fluid.

In another aspect, fluid in the fluid passage advances forward by capillary action to replace the portion of the fluid previously vaporized.

In another aspect, the fluid in the fluid passage eventually forms a meniscus at the outlet.

In another aspect, the overall shape of the PPT is rectangular.

In another aspect, insulation is disposed proximate to the fluid passage.

In another aspect, insulation is disposed between the fluid passage and the first electrode.

In another aspect, insulation is disposed between the fluid passage and the second electrode.

In another aspect, the invention provides a PPT comprising: a first electrode and a second electrode, the first electrode and the second electrode both being connected to a capacitor and a power supply; a plurality of fluid passages disposed between the first electrode and the second electrode; the fluid passages configured to receive a fluid and having an outlet; the fluid passages sized so that the fluid in the fluid passages flows by capillary action; and where a potential difference between the first electrode and the second electrode vaporizes a portion of the fluid.

In another aspect, insulation is disposed between the fluid passages and the first electrode.

In another aspect, insulation is disposed between the fluid passages.

In another aspect, the fluid passages are spaced equidistant from each other.

In another aspect, the fluid passages form a pattern and wherein the pattern is spaced equidistant from one of the electrodes.

In another aspect, the fluid passages form a pattern and wherein the pattern is spaced equidistant from both electrodes.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENT(S)

Figure 1:
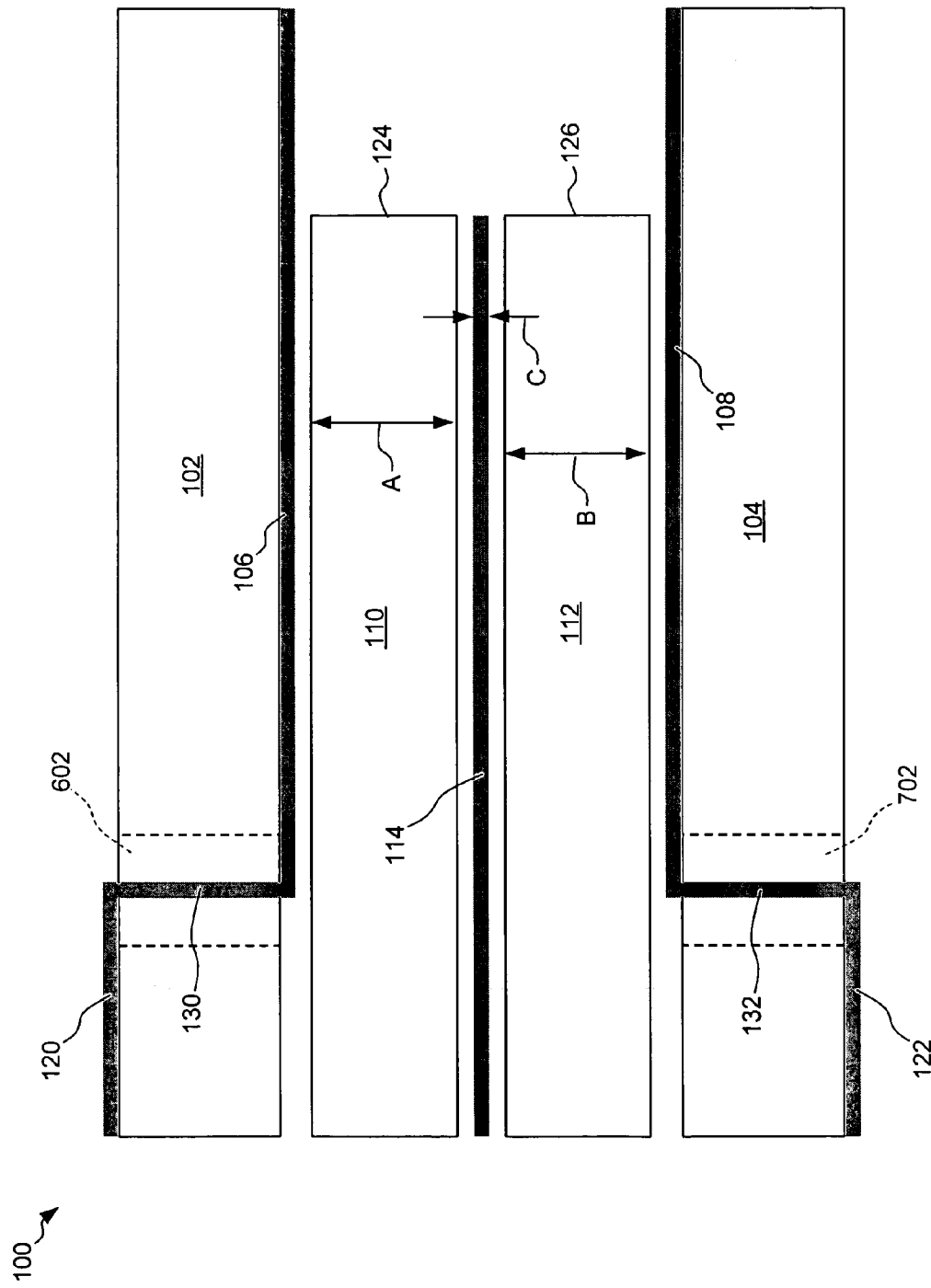
FIG. 1 is a schematic diagram of a cross-sectional view of a preferred embodiment of a solid fueled PPT.

FIG. 1 is a cross-sectional schematic diagram of a preferred embodiment of Pulsed Plasma Thruster (PPT) 100. PPT 100 includes a housing, and in the embodiment shown in FIG. 1, the housing is comprised of first substrate 102 and second substrate 104. Preferably, one or more layers of materials are disposed between the first and second substrates 102 and 104, respectively, to form PPT 100. In a preferred embodiment, a first conductive layer 106 is disposed on first substrate 102 and a second conductive layer 108 is disposed on second substrate 104.

Preferably, a first fuel layer 110, an igniter device 114 and a second fuel layer 112 are disposed between first conductive layer 106 and second conductive layer 108. In a preferred embodiment, first fuel layer 110 is disposed proximate to first conductive layer 106 and second fuel layer 112 is disposed proximate to second conductive layer 108. Also, igniter device 114 is preferably disposed between first fuel layer 110 and second fuel layer 112.

The substrates are preferably any material that can be used as a Printed Circuit Board (PCB). In a preferred embodiment, the substrates are a conventional fiberglass PCB. First and second conductive layers 106 and 108, respectively, are preferably made of a metallic material that is capable of conducting a charge of electricity. In some embodiments, those conductive layers are made of a precious metal, like copper, silver or gold. In a preferred embodiment, first and second conductive layers 106 and 108 are made of copper.

As shown in FIG. 1, First fuel layer 110 has a thickness A, second fuel layer 112 has a thickness B and igniter device has a thickness C. In the embodiment shown in FIG. 1, A is roughly equal to B and both A and B are greater than C. However, it is possible to vary the thicknesses substantially. In some embodiments, A is thicker than B and in other embodiments, B is thicker than A. In some embodiments, the relative thicknesses of A and B can be varied. Some reasons for varying the thicknesses are discussed below.

Figure 2:
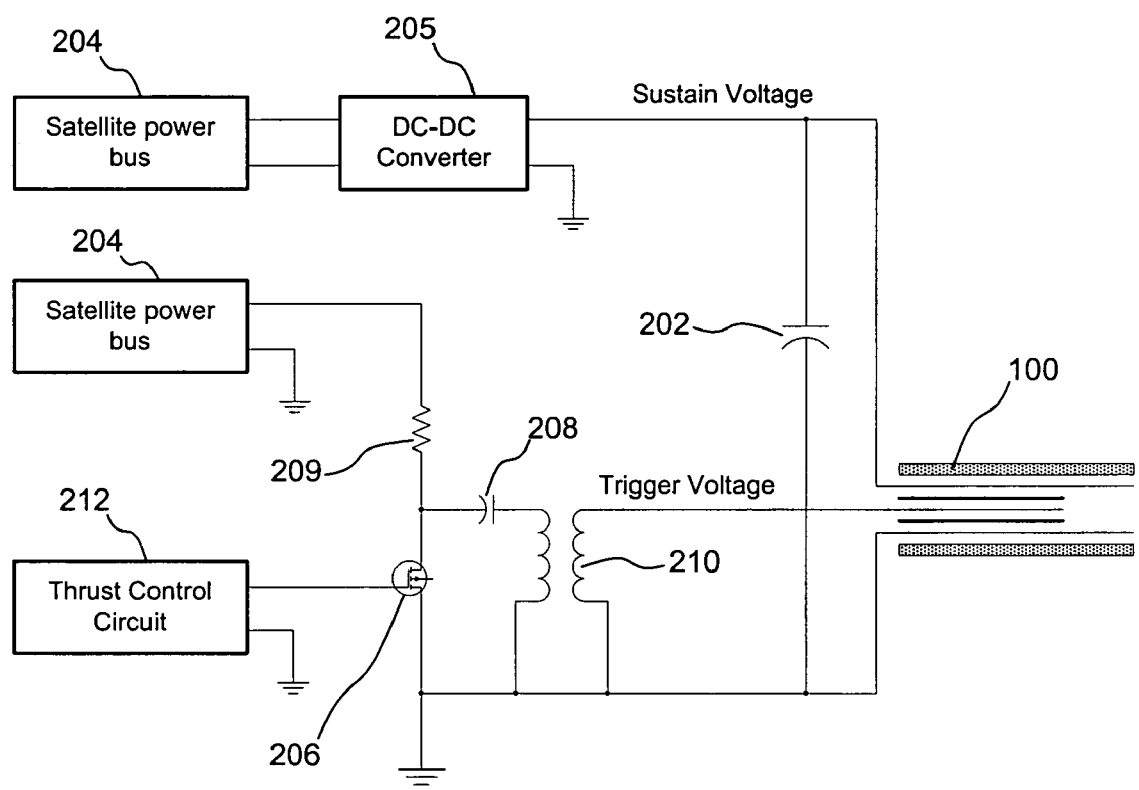
FIG. 2 is a schematic diagram of a preferred embodiment of an electrical system for a PPT.

In addition to the layers and structures disclosed above, PPT 100 preferably also includes provisions that assist in ablating certain layers or structures. These provisions can include an electrical system that provides energy and power to various components of PPT 100. FIG. 2 is a schematic diagram of a preferred embodiment of an electrical system 200 supporting PPT 100. Electrical system 200 includes a main discharge capacitor 202, which is also referred to as a sustain capacitor, connected to satellite bus 204. In some embodiments, an optional converter 205 is provided. Converter 205 can adjust or step up the voltage provided by satellite bus 204 to a desired or required voltage output. In some embodiments, converter is a step up DC-DC converter that increases the output voltage. Satellite power bus 204 is typically 28 VDC, but the circuit components can be selected to work with any voltage, including from 1.5 VDC and higher.

A trigger device 206 is connected to a spark capacitor 208 and to satellite bus 204. Preferably, trigger device 206 is a low impedance, high current solid state switch (such as a MOSFET device). In some embodiments, a resistor 209 is provided. In the embodiment shown in FIG. 2, a current limiting resistor 209 is provided between satellite power bus 204 and spark capacitor 208. Spark capacitor 208 is connected to igniter device 114. In some embodiments, a transformer 210 is provided between spark capacitor 208 and igniter device 114.

Referring to FIGS. 1 and 2, in stand by, trigger device 206 is open and does not pass current. This allows spark capacitor 208 to charge through resistor 209 and the primary coil of 210. During this time capacitor 202 is charged by the DC-DC converter 205. In operation, trigger device 206 receives a signal from thrust control circuit 212. This causes spark capacitor 208 to discharge through transformer 210 generating a high voltage trigger. The trigger voltage initiates operation in PPT 100, and this causes a spark to occur from igniter device 114 to second conductive layer 108. Electrical system 200 and spark capacitor 208 are designed so that this spark causes a first ablation event of one of the fuel layers, for example, the second fuel layer 112. This first ablation event releases ions or other charged particles near the end face 124 of second fuel layer 112.

The first ablation event, in turn, causes main discharge capacitor 202 to discharge and produce a higher energy, second spark between first conductive layer 106 and second conductive layer 108. In other words, the sustain capacitor 202 furnishes the energy for the sustain. This second spark helps to ablate first fuel layer 110 and second fuel layer 112. The self-induced Lorentz magnetic forces and gaseous thermal expansion caused by the high current discharge of capacitor 202 causes the plasma to be accelerated down the length of conductive layers 106 and 104; pushing the released ions and particles out the end of the PPT at 1102. The high velocity exit of the ions and particles produces thrust. Once the plasma reaches the end of PPT 100 the energy from main discharge capacitor 202 is expended and the arc between the electrodes extinguishes. Since current is no longer flowing through PPT 100, main discharge capacitor 202 can recharge from converter 205 or satellite power bus 204. Thrust control circuit 212 turns trigger device 206 off and spark capacitor 208 is recharged, preferably, through resistor 209. The repetition of this operation is controlled by thrust control circuit 212, which can control how many pulses per second and for how many seconds pulses are generated to create the overall thrust desired.

As first fuel layer 110 and second fuel layer 112 ablate, a portion of igniter device 114 is also preferably consumed and is sublimated (transitions from a solid to a gas). Thus, in the embodiment shown in FIG. 1, first fuel layer 110, second fuel layer 112 and igniter device 114 are all preferably slightly consumed when first fuel layer 110 and second fuel layer 112 are ablated. The consumption of igniter device 114 allows PPT 100 to operate without any moving parts. In other PPT designs, a spring or some other mechanical device is required to advance the ends of one or more fuel bars towards an ablating region that includes a pair of electrodes and usually a spark device. In the embodiment shown in FIGS. 1-3, the consumption of igniter device 114, along with the consumption of the two fuel layers, helps to insure that the ends 124 and 126 of first and second fuel layers, respectively, are located in an ablation region. In the embodiment shown in FIGS. 1-3, the ablation region is where a spark device, in this case, igniter device 114, is proximate ends 124 and 126. A post-ablation condition is shown in FIG. 3, which is an enlarged schematic diagram of first fuel layer 110, igniter device 114 and second fuel layer 112.

Igniter device 114 is consumed while first conductive layer 106 and second conductive layer 108 are preferably not consumed. This can be controlled by carefully selecting or designing the relative masses of first conductive layer 106, second conductive layer 108 and igniter device 114. Preferably, the masses of first conductive layer 106 and second conductive layer 108 are larger than the mass of igniter device 114. This prevents the first and second conductive layers 106 and 108 from being consumed, but helps to insure that igniter device 114 is consumed when the first and second fuel layers 110 and 112 are ablated.

In some embodiments, the three inner layers, first and second fuel layers 110 and 112 and igniter layer 114, are designed to be consumed at substantially similar rates. In other embodiments, this is not the case, and the three inner layers are consumed at unequal rates. However, it is preferable for the inner three layers to be consumed at substantially similar rates, as shown in FIG. 3.

Figure 3:
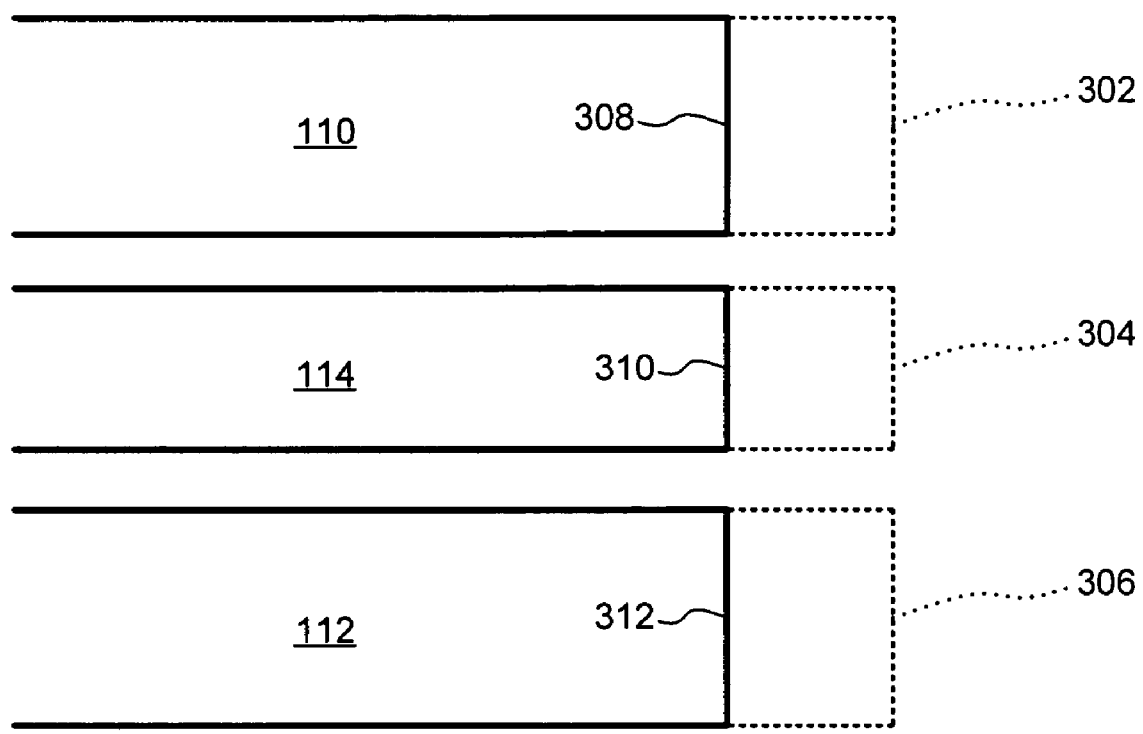
FIG. 3 is a schematic diagram of an enlarged cross-sectional view of a preferred embodiment of several layers.

Referring to FIG. 3, which shows a schematic diagram of a preferred embodiment of the inner three layers before and after an ablating event, first fuel layer 110 has an initial length 302, second fuel layer has an initial length 306 and igniter device 114 has an initial length 304. After an ablating event, which could be either the first ablating event, the second ablating event or both the first and second ablating events combined, portions of one or more layers are consumed.

In the embodiment shown in FIG. 3, a portion of each of the three inner layers has been consumed after an ablating event. As shown in FIG. 3, a portion of first fuel layer 110 has been consumed and first fuel layer 110 has a post-ablation length 308 that is shorter than initial length 302. Similarly, a portion of second fuel layer 112 has been consumed and second fuel layer 112 has a post-ablation length 312 that is shorter than initial length 306. In the embodiment shown in FIG. 3, a portion of igniter device 114 is also designed to be consumed during an ablation event and igniter device 114 also has a post-ablation length 310 that is shorter than its initial length 304.

Substantially equal consumption of each of the inner three layers is preferred. This can help to facilitate the next ablation event or events by providing an open path from igniter device 114 to one of the conductive layers. Substantially equal consumption also helps to insure that subsequent ablation events will result in similar thrust impulses.

Although substantially equal consumption of the three inner layers is preferred, it can be difficult to design PPT 100 so that each of the inner three layers is consumed at exactly the same rate. This is because of the unpredictable nature of one or more of the ablation events. However, substantially similar rates of consumption for the inner three layers are preferred. Several factors influence the rates of consumption for each of the inner three layers. These factors include the relative thickness of each layer, the relative position of one layer with respect to another layer, the relative position of one layer with respect to one or both conductive layers, the material properties of the layer in question, and the voltage or electrical energy of one or more of the ablation events. Each of these factors can be designed to assist or facilitate substantially similar consumption rates. However, even after all of the factors have been judiciously selected and tuned to achieve substantially similar consumption rates, there still may be some slight mismatch in the rates of consumption in some embodiments.

Figure 4:
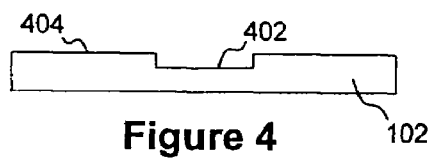
FIG. 4 is a schematic diagram of a front view of a preferred embodiment of a substrate.
Figure 5:
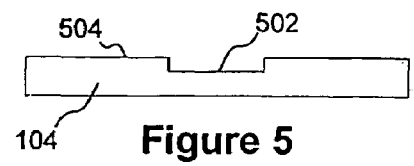
FIG. 5 is a schematic diagram of a front view of a preferred embodiment of a substrate.
Figure 6:
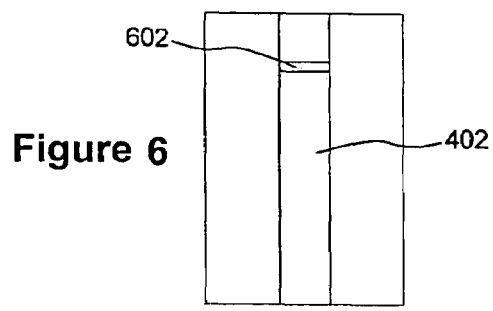
FIG. 6 is a schematic diagram of a top view of a preferred embodiment of a substrate.
Figure 7:
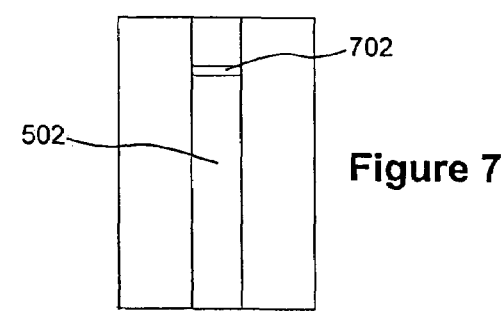
FIG. 7 is a schematic diagram of a top view of a preferred embodiment of a substrate.
Figure 8:
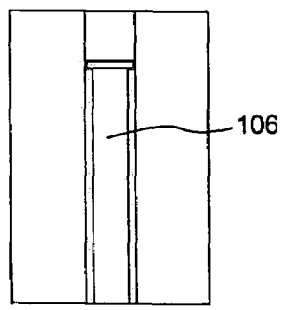
FIG. 8 is a schematic diagram of a top view of a preferred embodiment of a substrate.
Figure 9:
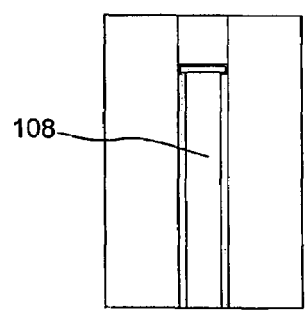
FIG. 9 is a schematic diagram of a top view of a preferred embodiment of a substrate.

Preferably, PPT 100 is designed so that the device is susceptible to manufacture. FIGS. 4 to 10 are schematic diagrams of a preferred embodiment of several steps of a manufacturing process for PPT 100. FIG. 4 is a schematic diagram of an end view of first substrate 102 and FIG. 6 is a top view of first substrate 102. Similarly, FIG. 5 is an end view of second substrate 104 and FIG. 7 is a top view of second substrate 104. Referring to FIGS. 4 and 6, in the first two steps, a groove 402 is formed on an upper surface 404 of first substrate 102. Referring to FIGS. 5 and 7, a similar groove 502 is formed on upper surface 504 of second substrate 104. Alternatively, the groove 402 in plate 404 can be made deeper and 504 becomes a flat plate. Preferably, upper hole 602 is formed in first substrate 102 and lower hole 702 is formed in second substrate 104. In some embodiments, the holes are formed before the grooves, in other embodiments, the groove is formed first and then the hole is formed.

In the second stage, first conductive layer 106 is associated with substrate 102. In some embodiments, first conductive layer 106 is copper, as disclosed above. In some embodiments, first layer 106 is printed onto substrate 102. In other embodiments, first layer 106 is a ribbon or tape-like material that is applied or attached to substrate 102. In other embodiments, first conductive layer 106 is sprayed, sputtered or deposited onto substrate 102. In any case, first conductive layer 106 is preferably associated with substrate 102. In some embodiments, first conductive layer 106 is attached directly to substrate 102, in other embodiments, an intermediate material, adhesive or layer is disposed between first conductive layer 106 and substrate 102. Similar processes can be used to associate second conductive layer 108 with second substrate 104. Preferably, the same process that associates first conductive layer 106 with first substrate 102 is used to associate second conductive layer 108 with second substrate 108, however, it is possible to use a different process.

Referring to FIGS. 1 and 4 to 10, preferably, a first conductor 130 is provided near hole 602 that places first outer contact 120 in electrical communication with first conductive layer 106. Likewise, preferably, a second conductor 132 is provided near hole 702 and this second conductor 132 places second outer contact 122 in electrical communication with second conductive layer 108. This can be done at this stage or at a later stage of the manufacturing process.

In the next step, the fuel layers are associated. Preferably, first fuel layer 110 is associated with first substrate 102 and second fuel layer 112 is associated with second substrate 104. The fuel layers 110 and 112 can be applied in various different ways. In some embodiments, the fuel layers can be sprayed, sputtered, glued, or deposited onto a respective conductive layer or onto a substrate. In other embodiments, chemical vapor deposition is used to associate one or more fuel layers to the respective substrates. In some cases, similar processes are used to associate first fuel layer 110 to first substrate 102 and second fuel layer 112 to second substrate 104. In other cases, different processes are used, and the process used to associate first fuel layer 110 with first substrate 102 is different than the process used to associate second fuel layer 112 with second substrate 104.

Preferably, each fuel layer 110 and 112 is applied substantially over respective first conductor 106 and second conductor 108. In other words, the fuel layer is substantially the same size as its respective conductor, and if viewed from above, the fuel layer would substantially cover or blanket its respective conductor, except for a portion of the conductor approaching the exit 140. In this embodiment, first fuel layer 110 is disposed within first groove 402 and second fuel layer 112 is disposed within second groove 502. In other embodiments, the fuel layer is sized differently than its respective conductive layer. In some embodiments, the fuel layer is larger than its respective conductive layer and in other embodiments, the fuel layer is smaller than its respective conductive layer. In these embodiments where the fuel layer is smaller than its respective conductive layer, the fuel layer can be smaller in one or more dimensions. For example, the fuel layer can have substantially the same width as its respective conductive layer, but be shorter in length. In another example, the fuel layer can be shorter in length than its respective conductive layer, but thicker than its respective conductive layer.

Figure 10:
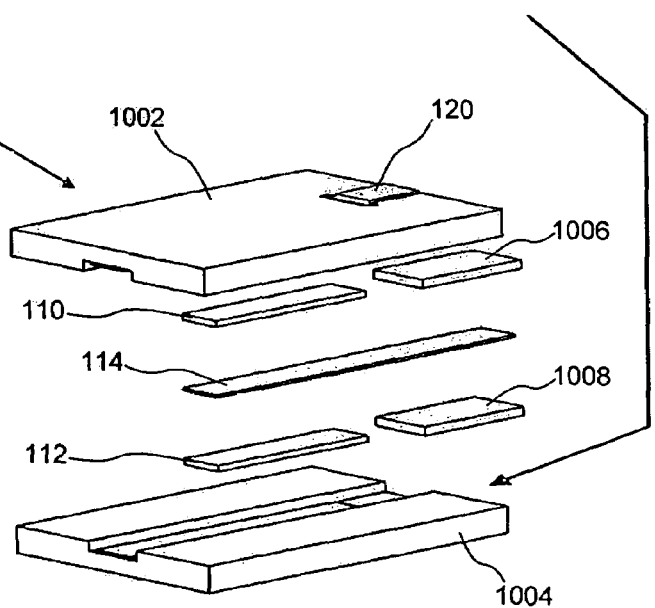
FIG. 10 is a schematic diagram of an exploded view of a preferred embodiment of a PPT during assembly.

Preferably, after the two fuel layers 110 and 112 are associated with their respective substrates, igniter device 114 is associated with PPT 100. Preferably, igniter device 114 is disposed between the two fuel layers 110 and 112. Preferably, igniter device 114 is associated with one of the fuel layers, and then the other substrate is inverted and the whole assembly is sandwiched together. An embodiment of this assembly step is shown in FIG. 10. This results in the structure shown in FIG. 1.

Igniter device 114 can be applied to either of the fuel layers 110 and 112 in various different ways. In some embodiments, a portion of igniter device 114 is associated with first fuel layer 110 and another portion of igniter device 114 is associated with second fuel layer 112. When assembled, the two portions are joined to form igniter device 114. In other embodiments, igniter device 114 is associated with a single fuel layer.

Many different techniques can be used to associate igniter device 114 to one of the fuel layers. In some embodiments, igniter device 114 is sprayed, sputtered, or deposited onto one of the fuel layers. In other embodiments, chemical vapor deposition is used to associate igniter device 114 with one of the fuel layers.

Preferably, igniter device 114 is applied substantially over one of the fuel layers, for example, first fuel layer 110. In other words, the igniter device 114 is substantially the same size as first fuel layer 110, and if viewed from above, igniter device 114 would substantially cover or blanket first fuel layer 110. It is possible to place igniter device 114 within first groove 402 associated with first fuel layer 110. In other embodiments, igniter device 114 is sized differently than one of the fuel layers. In some embodiments, the fuel layer is larger than its respective conductive layer and in other embodiments, igniter device 114 is smaller than the fuel layer. In these embodiments where igniter device 114 is smaller than the fuel layer, igniter device 114 can be smaller in one or more dimensions. For example, igniter device 114 can have substantially the same width as the fuel layer, but be shorter in length. In another example, igniter device 114 can be shorter in length than the fuel layer, but thicker in height than the fuel layer.

After all of the various different layers have been associated with their respective substrates, a pair of substrate assemblies, first substrate assembly 1002 and second substrate assembly 1004, result. First substrate assembly 1002 includes first substrate 102, first conductive layer 106 and first fuel layer 110. In some cases, first substrate assembly 1002 can also include igniter device 114. Second substrate assembly 1004 includes second substrate 104, second conductive layer 108 and second fuel layer 112. In some cases, second substrate assembly 1004 can also include igniter device 114.

The two substrate assemblies 1002 and 1004 are then joined together in the manner shown in FIG. 10. Preferably, the upper surface 404 of first substrate 102 is oriented to confront the upper surface 504 of second substrate 104. The two substrates 102 and 104 are also preferably oriented so that their respective grooves 402 and 502 are aligned and their respective holes 602 and 702 are also generally aligned as shown in FIG. 10. In a preferred embodiment, insulators are provided behind the fuel layers. In the embodiment shown in FIG. 10, first insulator 1006 is disposed behind first fuel layer 110 and second insulator 1008 is disposed behind second fuel layer 112. The insulators can be disposed or associated with PPT 100 using any desired or suitable technique. In some embodiments, techniques similar to those used to associate one or more fuel layers is also used to associate the insulators.

Figure 11:
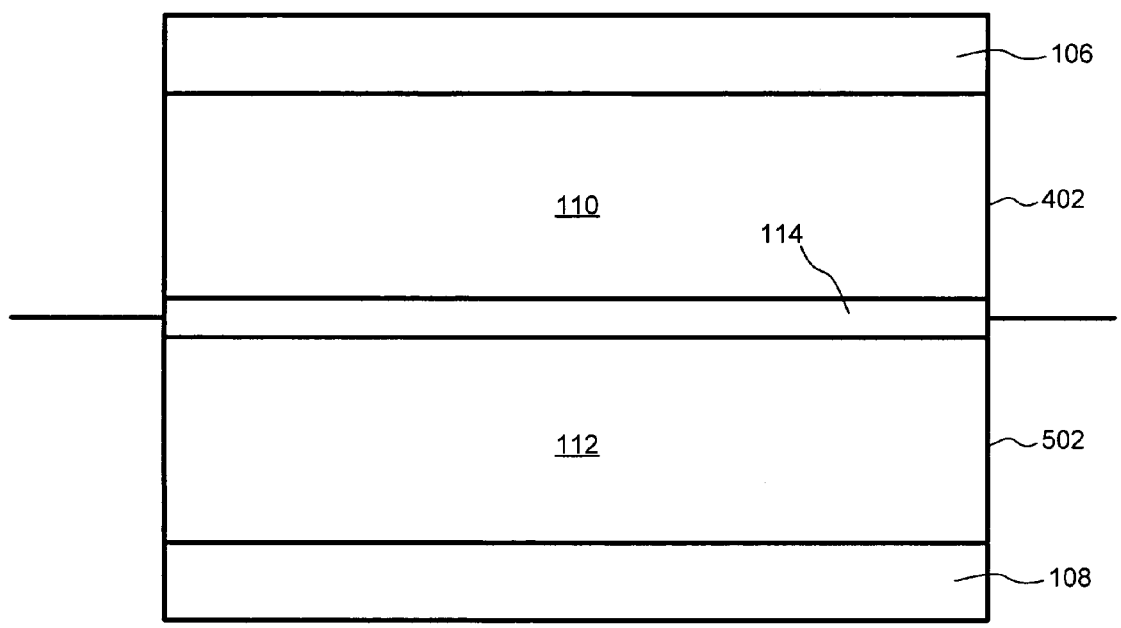
FIG. 11 is a schematic diagram of an enlarged front view of a preferred embodiment of a PPT.

Preferably, the various components are assembled as shown in FIG. 10. After assembly, the various layers and substrates preferably form the layered structure shown schematically in FIG. 11, which is a front schematic view of PPT 100. As shown in FIG. 11, first groove 402 of first substrate 102 and second groove 502 of second substrate 104 form a thruster aperture 1102. The various layers are preferably disposed within thruster aperture 1102. First conductive layer 106 is proximate first substrate 102, and first fuel layer 110 is disposed between first conductive layer 106 and igniter device 114. Second fuel layer 112 is disposed between igniter device and second conductive layer 108. Finally, second conductive layer 108 is proximate to second substrate 104.

Figure 12:
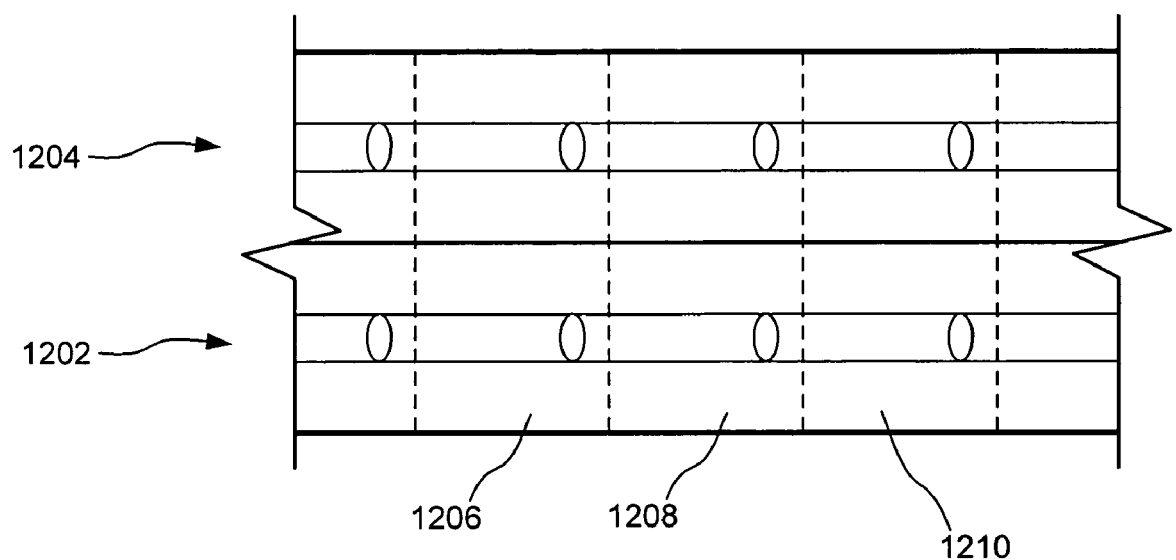
FIG. 12 is a schematic diagram of a top view of a preferred embodiment of multiple substrate pieces.

The preferred PPT 100 is designed so that PPT 100 is susceptible to rapid mass production. Preferably, PPT 100 is made using known Printed Circuit Board ("PCB") manufacturing techniques. FIG. 12 shows one embodiment of a possible manufacturing process that can be employed in making PPT 100. Multiple substrate components of PPT 100 can be mass produced at once. As shown in FIG. 12, a first strip 1202 of substrate components can be formed. In this embodiment, successive substrate components are produced as in a single strip 1202. As shown in FIG. 12, first substrate component 1206 can be made adjacent to second substrate component 1208 and up to an Nth substrate component 1210. The substrate components can all have their grooves formed by a similar manufacturing process and all of the substrate components can also have all of their holes formed by a common process. After the grooves and holes are formed, the substrate components can be separated using known manufacturing techniques.

In an alternative embodiment, multiple strips can be made next to one another. In the embodiment shown in FIG. 12, second strip 1204 is produced next to first strip 1202. In some cases, first strip 1202 is adjacent to second strip 1204, but in other embodiments, second strip is disposed next to first strip 1202 with additional material or another component separating the two strips. In any case, multiple strips can be made together on a common blank or stock material. The cut lines between successive substrate components can be staggered, as shown in FIG. 12, or they can be aligned. Both embodiments are contemplated. Alternatively, before cutting the devices apart, conductors 106, 130 and 120 can be applied to strips 1202-1204. Next fuel 110 can be applied over the conductors. Conductors 108, 132 and 122, fuel 112, and igniter 114 can be applied to a second set of strip identical to 1202-1204. The two sets of strips can be sealed together before cutting apart the individual PPTs 1206, 1208, 1210, etc.

Figure 13:
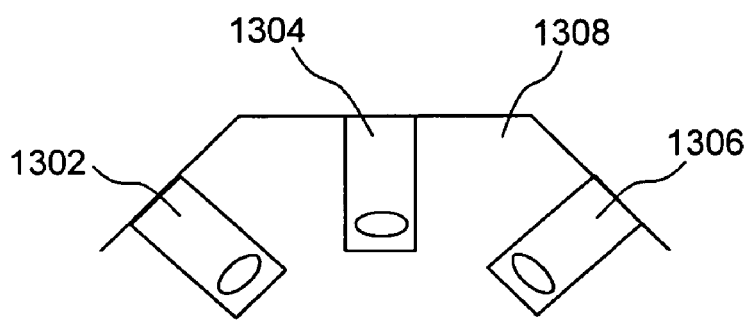
FIG. 13 is a schematic diagram of a top view of a preferred embodiment of an array of PPT's.

Principles of the present invention can be applied to form arrays of PPT's. FIG. 13 is a schematic top view of an array of PPT's. In the embodiment shown in FIG. 13, first PPT 1302 is disposed at an angle with respect to second PPT 1304. In this embodiment, first PPT and second PPT 1304 are formed by a common substrate 1308. Preferably, common substrate 1308 is formed of two similar substrate components as disclosed above. Optionally, the array of PPT's shown in FIG. 13 can include a third PPT 1306 that is angled with respect to second PPT 1304. In other embodiments, the PPT's are not angled with respect to one another.

Figure 14:
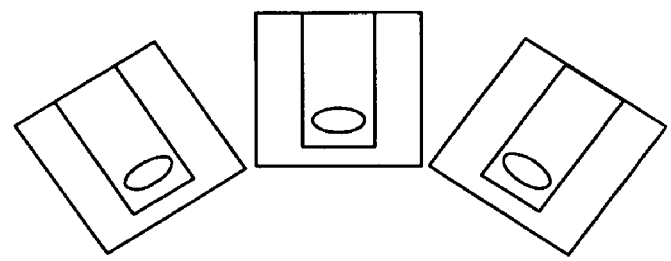
FIG. 14 is a schematic diagram of a top view of a preferred embodiment of an array of PPT's.

FIG. 14 shows another embodiment of an array of PPT's. In this embodiment, individual PPT's that do not share a common substrate are disposed in an array. In this array, the various PPT's can be angled with respect to each other, or not angled with respect to each other.

Figure 15:
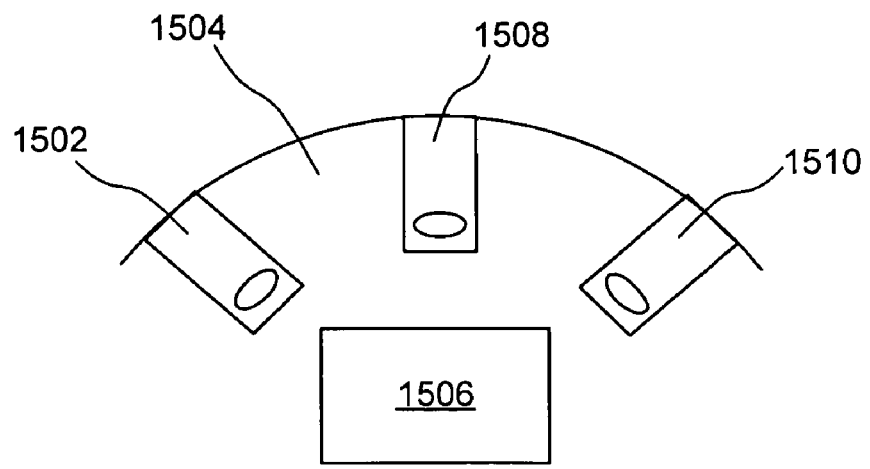
FIG. 15 is a schematic diagram of a top view of a preferred embodiment of an array of PPT's.

In the embodiment shown in FIG. 15, one or more PPT's are disposed on a common substrate with other devices. First PPT 1502 is disposed on common substrate 1504. Preferably, in this embodiment, other devices 1506 are also associated with common substrate 1504. These other devices can include integrated circuits, silicon chips, surface mount devices, electrical components, or any and other device that can be mounted onto a PCB, reference FIG. 2. Optionally, common substrate 1504 can include additional PPT's, for example, second PPT 1508 and/or third PPT 1510.

Figure 16:
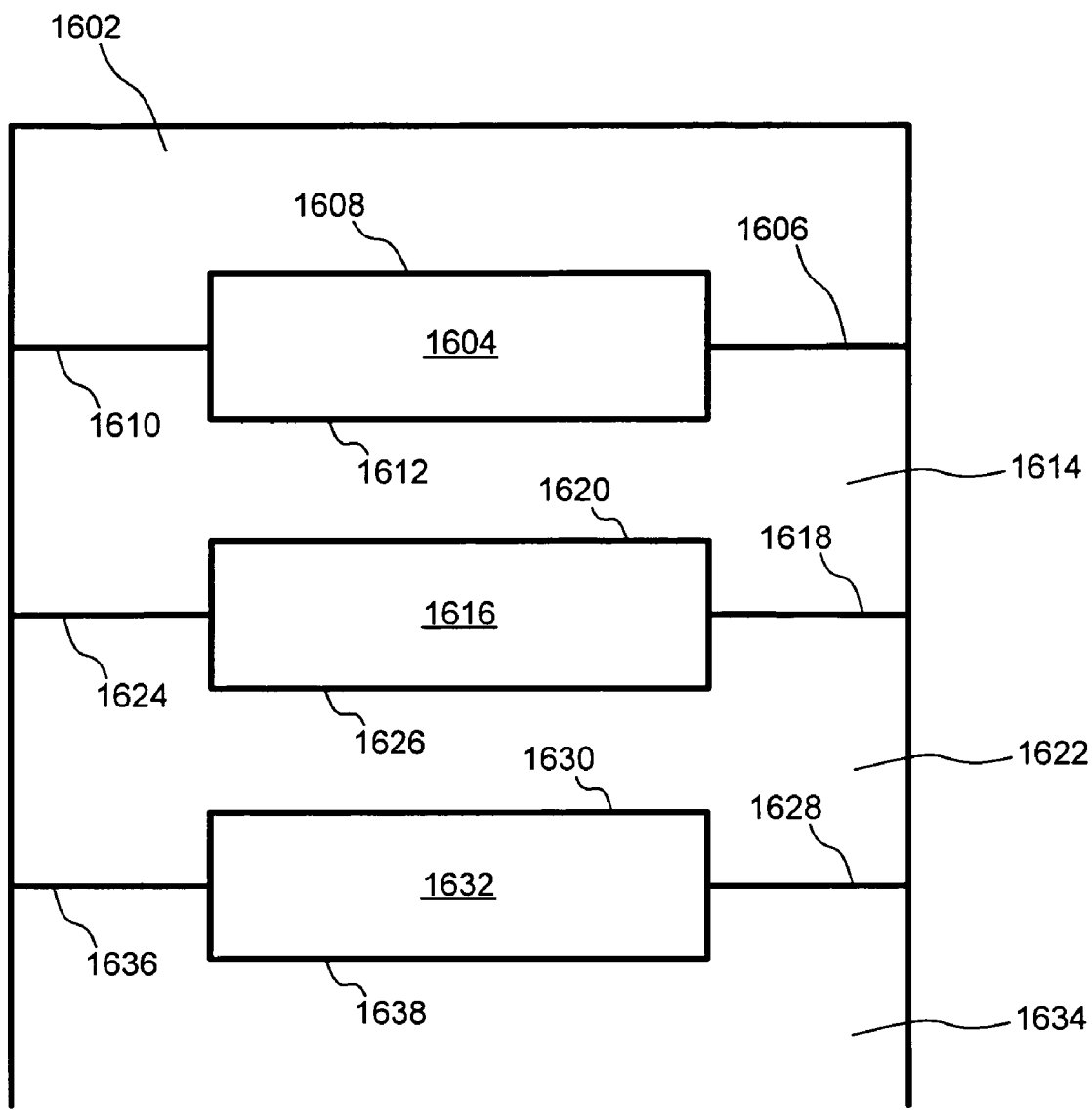
FIG. 16 is a schematic diagram of a front view of a preferred embodiment of an array of PPT's.

FIG. 16 is a schematic diagram of another embodiment of an array of PPT's. In this embodiment, the PPT's are vertically arrayed. First substrate 1602 forms the upper portion of first thruster aperture 1604. Preferably, the upper portion of thruster aperture 1604 is formed by first groove 1608 disposed on the lower surface 1606 of first substrate 1602. The lower portion of first thruster aperture 1604 is formed by a groove 1612 disposed on the upper surface 1610 of second substrate 1614. In this embodiment, the lower surface 1618 of second substrate 1614 forms the upper portion of second thruster aperture 1616. Preferably, a groove 1620 formed on the lower surface 1618 of second substrate 1614 forms the upper portion of second thruster aperture 1616. In some embodiments, a third thruster aperture 1632 may be needed. Preferably, a groove 1630 formed on the lower surface 1628 of third substrate 1622 forms the upper portion of third thruster aperture 1632. And a groove 1638 formed on the upper surface 1636 of fourth substrate 1634 forms the lower portion of third thruster aperture 1632.

This arrangement efficiently increases the density of thruster apertures and any desired number of PPT's can quickly and economically be formed. This vertical array pattern can continue with a single substrate forming portions of two thruster apertures. If another thruster aperture is needed, the lower portion (not shown) of the third substrate 1634 can be used to form the upper portion a forth thruster aperture (not shown). This pattern can continue until the desired number of thruster apertures is formed. Preferably, an end piece, similar to an upside down version of first substrate 1602 is used at the bottom of the array. In some embodiments, multiple vertical arrays are placed next to each other to produce an M×N matrix of thruster apertures, where M is the number of horizontal rows of thruster apertures and N is number of vertical columns of thruster apertures.

Figure 17:
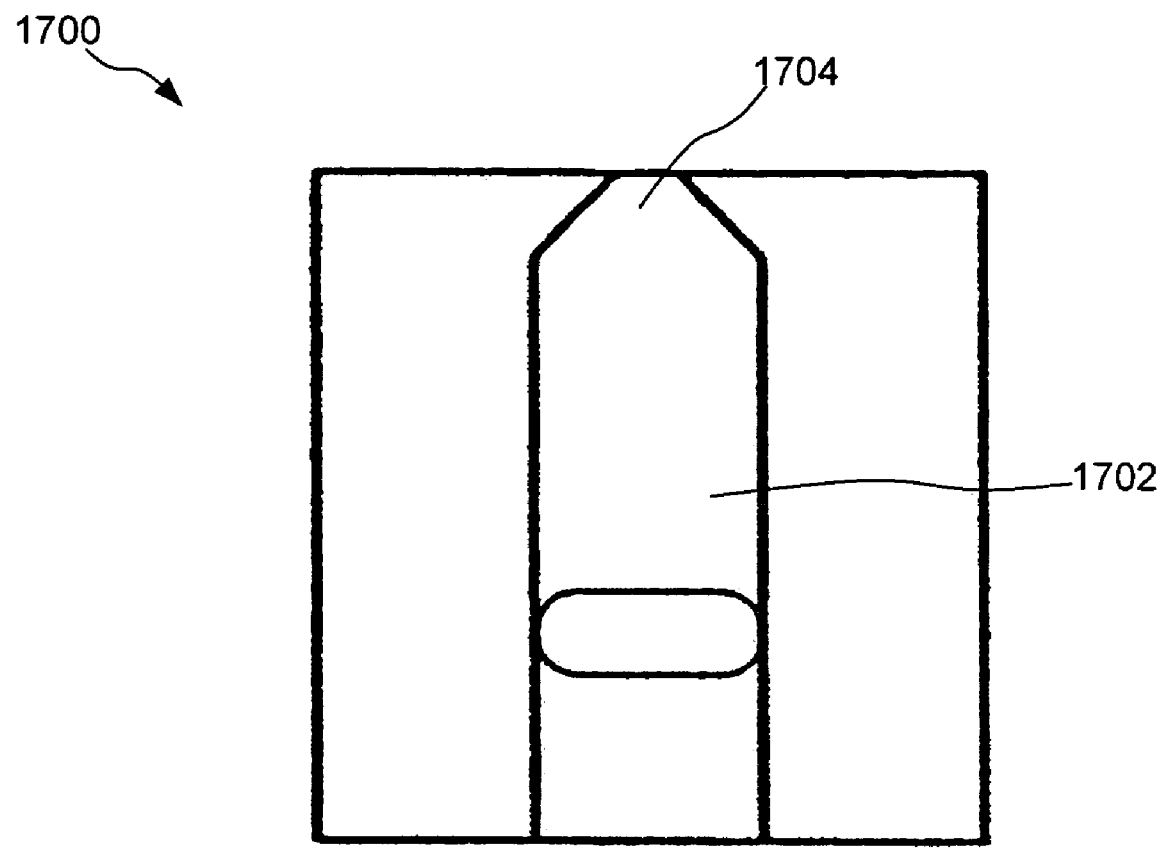
FIG. 17 is a schematic diagram of a top view of a preferred embodiment of a substrate.
Figure 19:
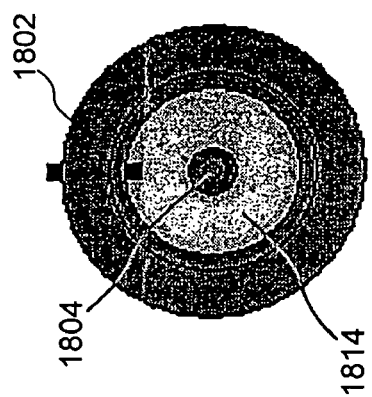
FIG. 19 is a schematic diagram of a front view of a preferred embodiment of a PPT.

FIG. 17 is a schematic diagram of a top view of another embodiment of a substrate 1700. In this embodiment, groove 1702 includes an integrated nozzle portion 1704. Preferably, the corresponding substrate that joins with this substrate to define a thruster aperture also includes a substantially similar nozzle portion. This nozzle design can be applied to any of the PPT embodiments and to any of the arrays of PPT's as well.

Figure 18:
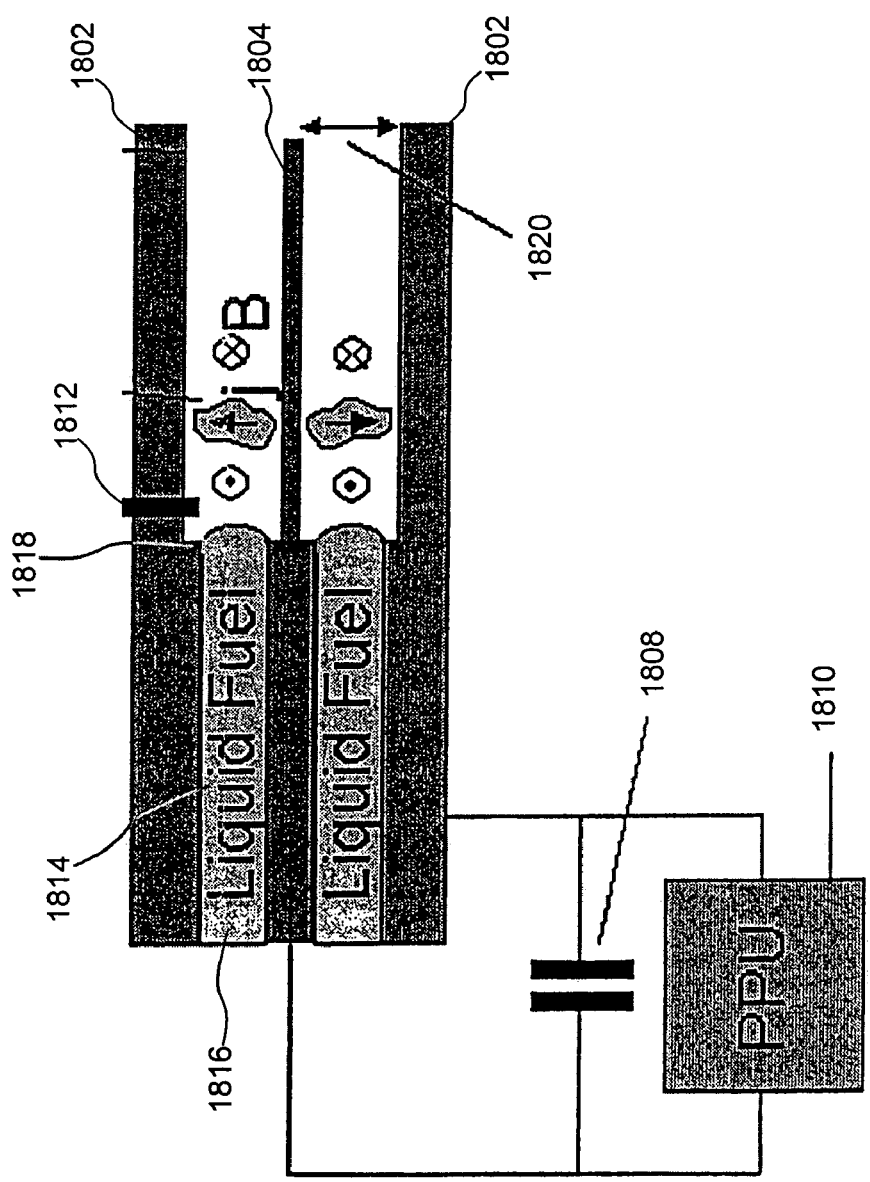
FIG. 18 is a schematic diagram of a cross-sectional view of a preferred embodiment of a PPT.

FIG. 18 is an embodiment of another PPT 1800. PPT 1800 has a coaxial design. PPT 1800 includes an outer electrode 1802 and an inner electrode 1804. Preferably, outer electrode 1802 is disposed radially outward of inner electrode 1804 and is coaxial with center electrode 1804. These two electrodes are connected to discharge capacitor 1808 and spacecraft bus 1810 via the Power Processing Unit 1809, which provides power to PPT 1800. PPT 1800 can also include an optional spark plug 1812.

PPT 1800 preferably uses a liquid fuel and includes fluid passage 1814. Preferably, fluid passage 1814 is disposed between inner electrode 1804 and outer electrode 1802 and is designed to act as a capillary tube for liquid fuel 1816. This means that the fluid passage 1814 is designed so that the liquid fuel 1816 progressively flows through fluid passage 1814 towards axial end 1818 and forms a meniscus at axial end 1818. Preferably, fluid passage 1814 is also sized so that the meniscus formed by liquid fuel 1816 provides enough surface tension to counter the pressure head of liquid fuel 1816. Pressure head can include internal pressure of liquid fuel 1816 and/or vapor pressure. Preferably, the solid to liquid interaction between the electrodes 1802 and 1804 and liquid fuel 1816 is non-wetting, and a convex meniscus, as shown in FIG. 18, is formed.

In operation, the electrical components cooperate to vaporize a portion of liquid fuel 1816. The operation of the electrical components is conventionally known. A portion of liquid fuel 1816 including the meniscus is vaporized and a plasma is formed. The Lorentz magnetic forces and gaseous thermal expansion caused by the high current in the plasma and the conductors 11802 and 1804 cause the ions and particles to accelerate down the electrodes and exit and 1820 with a high velocity, creating thrust. After the meniscus has been vaporized, the liquid fuel 1816 in fluid passage 1814 is no longer in equilibrium, and the internal pressure or pressure head of liquid fuel 1816 advances the liquid fuel 1816 until another meniscus is formed at the axial end 1818 of fluid passage 1814. After the second meniscus has been formed, PPT 1800 is ready to provide another pulse of thrust by ablating a second portion of liquid fuel 1816. After this second portion has been vaporized, the process repeats, with capillary action continually advancing liquid fuel 1816 to the axial end 1818 of fluid passage 1814. The advance of the liquid fuel 1816 is stopped by the meniscus that is formed at the axial end 1818 of fluid passage 1814.

Any desired liquid can be used. One consideration is that propellant losses occur as evaporation occurs from fluid passage 1814 between discharges or ablating events. These losses can be minimized by using a propellant with a very low vapor pressure. Another consideration is the proximity of the conductors. Due to the proximity of the liquid to the two conductors, a liquid having generally insulating or non-conducting qualities is preferred. This is because the liquid fuel needs to act as an insulator between the inner and outer electrodes 1802 and 1804, respectively. In a preferred embodiment, liquid fuel 1816 can be water, ammonia, or a mixture of the two. In addition to a liquid, other embodiments can use a melted solid propellant as the fuel.

Figure 20:
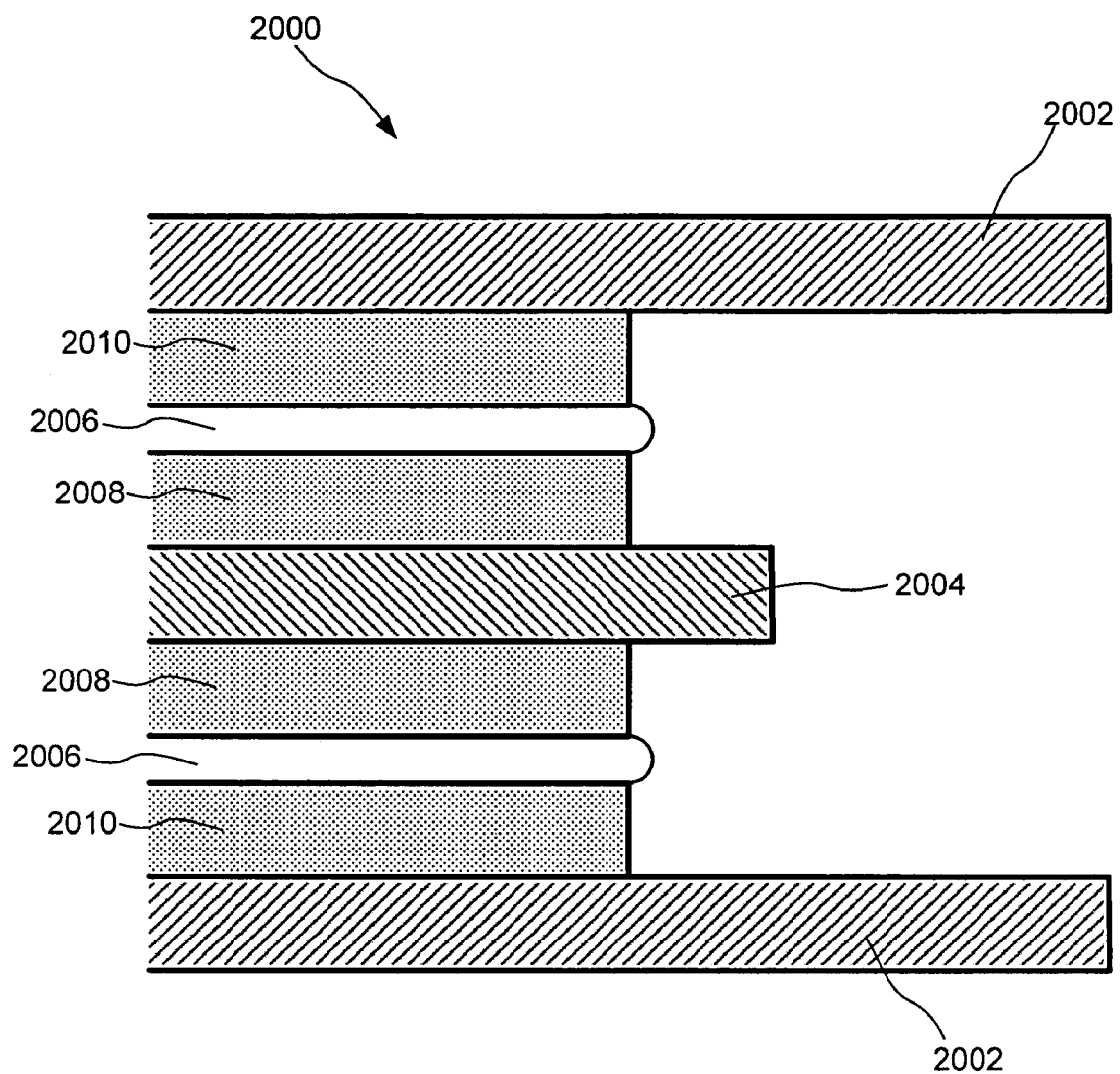
FIG. 20 is a schematic diagram of a cross-sectional view of a preferred embodiment of a PPT.
Figure 21:
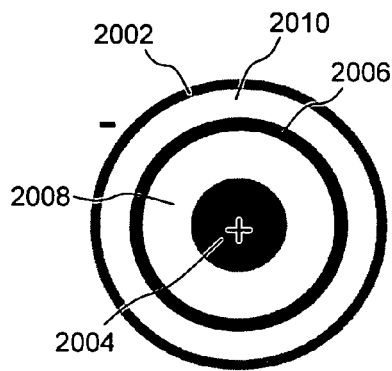
FIG. 21 is a schematic diagram of a front view of a preferred embodiment of a PPT.

FIGS. 20 and 21 show another embodiment of a liquid fuel based PPT 2000. PPT 2000 includes an outer electrode 2002, an inner electrode 2004 and a fluid passage 2006. PPT 2000 can also optionally include a spark plug (not shown). In this embodiment, insulation is disposed between fluid passage 2006 and the two electrodes. An inner insulator 2008 is disposed between inner electrode 2002 and fluid passage 2006 and an outer insulator 2010 is disposed between outer electrode 2002 and fluid passage 2006. In this embodiment it is possible to use a liquid fuel that is conductive, because the two insulating layers provide insulation between the inner electrode 2004 and the outer electrode 2002. Preferably, liquid metal, like mercury, is used if a conductive fuel is desired. It is also possible to use a liquid fuel that is non-conductive and provides insulation. Liquid fuel, in this embodiment, can be an insulator or a conductor.

Figure 22:
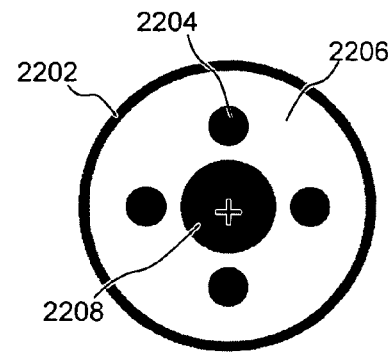
FIG. 22 is a schematic diagram of a front view of a preferred embodiment of a PPT.

FIGS. 22 to 25 are schematic diagrams showing front views other embodiments of a liquid fuel based PPT. Referring to FIG. 22, this PPT includes a first electrode 2202 and a second electrode 2208. Disposed between the two electrodes 2202 and 2208 is insulating portion 2206 and disposed in insulating portion 2206 is a plurality of fluid passages 2204. Preferably, more than one fluid passage is provided. In the embodiment shown in FIG. 22, the fluid passages 2204 are distributed about second electrode 2208. Preferably, the fluid passages 2204 are equally spaced from second electrode 2208. In the embodiment shown in FIG. 22, since second electrode 2208 is circular, preferably, each of the fluid passages 2204 is substantially the same radial distance from second electrode 2208. The fluid passages 2204 are also preferably equally distributed, thus, in the embodiment shown in FIG. 22 where there are four fluid passages 2204, they are distributed about 90° from each other.

Figure 23:
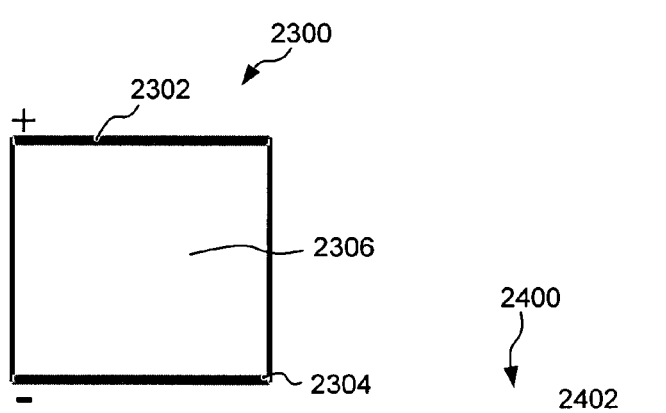
FIG. 23 is a schematic diagram of a front view of a preferred embodiment of a PPT.

FIG. 23 shows another PPT embodiment 2300, which is generally rectangular. In this embodiment, first electrode 2302 has a generally flat shape and second electrode 2304 has a similar generally flat shape. Disposed between the two electrodes 2302 and 2304 is fluid passage 2306. Preferably, fluid passage is rectangular and extends from first electrode 2302 to second electrode 2304. In some embodiments, PPT 2300 can be square.

Figure 24:
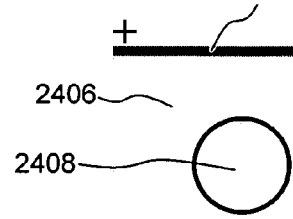
FIG. 24 is a schematic diagram of a front view of a preferred embodiment of a PPT.

FIG. 24 shows another PPT embodiment 2400, which has a generally rectangular overall shape. In this embodiment, first electrode 2402 has a generally flat shape and second electrode 2404 has a similar generally flat shape. Disposed between the two electrodes 2402 and 2404 is insulating portion 2406 and disposed within insulating portion 2406 is fluid passage 2408. Fluid passage 2408 can have a shape that is similar or different than the overall shape of PPT 2400. In the embodiment shown in FIG. 24, fluid passage 2408 has a different shape than the overall shape of PPT 2400 and has a generally round shape. Although fluid passage 2408 can be disposed anywhere within insulating portion 2406, a central location and/or a location equidistant from the two electrodes 2402 and 2404 is preferred. In some embodiments, PPT 2400 can be square.

Figure 25:
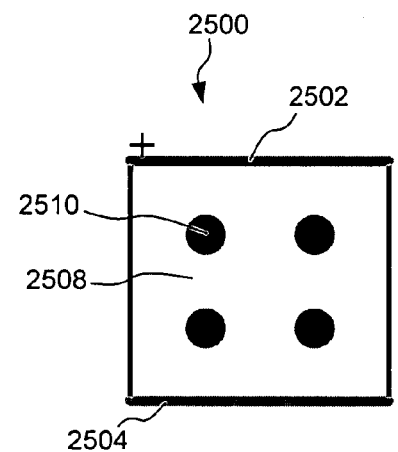
FIG. 25 is a schematic diagram of a front view of a preferred embodiment of a PPT.

FIG. 25 shows another PPT embodiment 2500, which has a generally rectangular overall shape. In this embodiment, first electrode 2502 has a generally flat shape and second electrode 2504 has a similar generally flat shape. Disposed between the two electrodes 2502 and 2504 is insulating portion 2508 and disposed within insulating portion 2508 is a plurality of fluid passages 2510. Fluid passages 2510 can have a shape that is similar or different than the overall shape of PPT 2500. In the embodiment shown in FIG. 24, fluid passages 2510 have a different shape than the overall shape of PPT 2500 and have a generally round shape. Although fluid passages 2510 can be disposed anywhere within insulating portion 2508, an equally distributed and/or central location equidistant from the two electrodes 2502 and 2504 is preferred. In the embodiment shown in FIG. 25, four fluid passages 2510 are provided and the fluid passages are arranged in a box-like configuration this a generally equidistant from the two electrodes 2502 and 2504. In some embodiments, PPT 2500 can be square.

Each of the various components, steps or features disclosed can be used alone or with other components, steps or features. Each of the components, steps or features can be considered discrete and independent building blocks. In some cases, combinations of the components, steps or features can be considered a discrete unit.

While various embodiments of the invention have been described, it will be apparent to those of ordinary skill in the art that may more embodiments and implementations are possible that are within the scope of the invention. Accordingly, the invention is not to be restricted except in light of the attached claims and their equivalents.

What is claimed is:

1. A PPT comprising:
   a housing formed by at least one substrate and including a thruster aperture;
   the thruster aperture including a first conductive layer, a first fuel layer, an igniter device, a second fuel layer and a second conductive layer;
   a main discharge capacitor and a power supply in electrical communication with the first conductive layer and the second conductive layer;

a trigger in electrical communication with the igniter device; and wherein the substrate is formed of a Printed Circuit Board.

2. The PPT according to claim 1, wherein the substrate is made of fiberglass.

3. The PPT according to claim 1, wherein the first conductive layer is copper.

4. The PPT according to claim 1, wherein the igniter device is relatively less massive than the first conductor.

5. The PPT according to claim 1, wherein the first fuel layer is a Teflon tape.

6. The PPT according to claim 1, wherein the igniter device has an axial length substantially similar to the first fuel layer.

7. The PPT according to claim 6, wherein the igniter device has an axial length substantially similar to the second fuel layer.

8. A PPT comprising:

a housing formed by at least one substrate and including a thruster aperture;

the thruster aperture including a first conductive layer, a first fuel layer, an igniter device, a second fuel layer and a second conductive layer;

a main discharge capacitor and a power supply in electrical communication with the first conductive layer and the second conductive layer;

a trigger in electrical communication with the igniter device; and wherein a potential difference across the first conductive layer and the second conductive layer ablates a portion of the first fuel layer and the second fuel layer and also sublimates a portion of the igniter device to create thrust.

9. The PPT according to claim 8, wherein the first fuel layer, the second fuel layer and the igniter device are consumed at substantially similar rates.

10. The PPT according to claim 8, wherein an ablating event consumes a substantially similar axial length portion of the first fuel layer, the second fuel layer and the igniter device.

11. The PPT according to claim 8, wherein the igniter device is less massive than the first conductive layer.

12. The PPT according to claim 11, wherein the igniter device is less massive than the second conductive layer.

13. The PPT according to claim 8, wherein a spark capacitor is in electrical communication with the trigger and the igniter device.

* * * * *